US009150972B2

(12) United States Patent
Vargas et al.

(10) Patent No.: US 9,150,972 B2
(45) Date of Patent: Oct. 6, 2015

(54) FUEL AUGMENTATION SUPPORT SYSTEM

(71) Applicant: NuCell Hydro, San Antonio, TX (US)

(72) Inventors: Alfredo Vargas, McAllen, TX (US); Jose A Vargas, McAllen, TX (US)

( * ) Notice: Subject to any disclaimer, the term of this patent is extended or adjusted under 35 U.S.C. 154(b) by 315 days.

(21) Appl. No.: 13/850,957

(22) Filed: Mar. 26, 2013

(65) Prior Publication Data

US 2014/0102882 A1 Apr. 17, 2014

Related U.S. Application Data

(60) Provisional application No. 61/615,774, filed on Mar. 26, 2012.

(51) Int. Cl.
*C25B 1/06* (2006.01)
*C25B 11/02* (2006.01)
*C25B 9/06* (2006.01)
*C25B 9/20* (2006.01)

(52) U.S. Cl.
CPC . *C25B 11/02* (2013.01); *C25B 1/06* (2013.01); *C25B 9/063* (2013.01); *C25B 9/20* (2013.01); *Y02E 60/366* (2013.01)

(58) Field of Classification Search
None
See application file for complete search history.

(56) References Cited

U.S. PATENT DOCUMENTS 4,105,528 A * 8/1978 Hasebe ..................... 204/237
4,140,090 A * 2/1979 Lindberg ..................... 123/265
5,244,558 A * 9/1993 Chiang ..................... 204/241
5,450,822 A * 9/1995 Cunningham ..................... 123/3
5,799,624 A * 9/1998 Hsieh ..................... 123/3
6,155,212 A * 12/2000 McAlister ..................... 123/3
6,238,546 B1 * 5/2001 Knieper et al. ..................... 205/742
6,336,430 B2 * 1/2002 de Souza et al. ..................... 123/3
6,972,077 B2 * 12/2005 Tipton et al. ..................... 204/269
2008/0047502 A1 * 2/2008 Morse ..................... 123/3
2010/0089676 A1 * 4/2010 Papachristopoulos ....... 180/69.4
2010/0132634 A1 * 6/2010 Selano ..................... 123/3
2010/0170454 A1 * 7/2010 McBride et al. ..................... 123/3

OTHER PUBLICATIONS hhoconnection, "HHO Wet Cell vs Dry Cell—Why the Dry Cell is Better", upload date: May 13, 2011, published on YouTube.com, https://www.youtube.com/watch?v=gQOxWXRsLB4, obtained on Mar. 31, 2015.*

* cited by examiner

*Primary Examiner* — Harry D Wilkins, III
(74) *Attorney, Agent, or Firm* — Gunn, Lee & Cave, P.C.

(57) ABSTRACT

Disclosed is a Fuel Augmentation Support System ("FASS"). The disclosed FASS herein is useful to support a multitude of electrolysis cell composition and designs. It provides a system which supports an uncontaminated electrolysis process via the prohibition of other elements from intermingling with the electrolytic fluid, without creating excess positive or negative pressures in a FASS operations, an example of producing gas using the electrolysis of distilled water combined with a catalyst of potassium Hydroxide will be used since it is a method to generate a combustible gas used to enhance the combustion of practically any fuel. The FASS exploits an efficient utilization of electrons generated between the electrolysis electrodes in order to produce gas and achieve it's goals.

1 Claim, 23 Drawing Sheets

75B
75A
75A
75A 9
34B
20A
38
5B
6B
1A
1B
8A
10A
32A
32B
20B
1C
25
21B
36
31
7
6A
27
44
11A
18A
16A
2A
2B
2C
10B
8B
12A 23
19
26B
16B
18B
26A
30B
22A
35
15
3A
3B
3C
33
14A
30A
34A
12B
17
14B
5A
13
11B
24B
21A
4A
4B
4C
29
28
22B
24A

75 A
75 A 61C
61B

FUEL AUGMENTATION SUPPORT SYSTEM

This application is based upon and claims priority from U.S. Provisional application Ser. No. 61/615,774, filed Mar. 26, 2012, which is incorporated herein by reference.

BACKGROUND OF THE INVENTION

Field of the Invention

Applicants' invention relates to a device to make inexpensive and durable systems for the production of gases. More particularly, it relates to the production of gasses used to: (1) enhance the combustion of any combustible element and/or material, (2) create other usable energy and/or elements, (3) promote complete ignition of parent fuels resulting in a greater power and reduction of environmental pollutants, (4) create electrical current by using a proton exchange membrane ("PEM"), (5) decompose and/or destroy unwanted material, via utilization of the gas produced during the electrolysis of a fluid, primarily but not limited to distilled water combined with a catalyst which accelerates the flow of electrical current.

Synergistic functions of all the components described in sections below culminate in an operational design which not only prolongs the functional life span of practically any design of electrolysis plates, but also minimize maintenance requirements while practically eliminating the requirement for operator intervention.

SUMMARY OF THE INVENTION

The present invention is for a Fuel Augmentation Support System ("FASS"). The disclosed FASS has multiple potential functions. The overall design is useful to prolong the functional life span of practically any design of electrolysis plates (e.g., 316L, stainless steel electrolysis plates). The present invention presents a new design of plates which maximizes the electron performances by inhibiting electron leakage, resulting in enhanced production of gas. Another facet of this invention which makes the plates function more efficiently are the cooling radiators built into the FASS. Cooling the FASS enhances its ability to operate with higher amperage, resulting in increased gas production. The cooler the electrons, the more efficient they are. Also, the lower temperature reduces the creation of water vapor, facilitating the production of cleaner and dryer gas, and reducing the unit's water consumption.

The FASS contains a unique float switch which maintains the FASS fluid at optimum level. The float switch reduces the frequency of activation of the filler pump and provides for a wider range of on/off positions which allows the user to set exact fluid level ranges and keeps the catalyst fluid in the FASS at an optimum level. By maintaining the FASS's fluid level oscillation to a minimum, the FSS operates at a narrower temperature range. It also stabilizes the electrical current flow which tends to increase gas production with minimal or no water vapor contamination. The expansion chamber (rubber bladder) is an elastic chamber that, due to its elastic material properties, will expand and accept gasses into it when the system is operating, then those same elastic properties push the gasses back out when the system is shut-off. In this manner, the effects of positive and negative pressures within the FASS are minimized.

The plates, where the gas is produced, are designed for maximum performance. When electrons jump from one plate to another, they collide with water molecules and split them into hydrogen and oxygen. The objective is to create a path which forces the electrons to be more productive (create more gas) by jumping from one plate to another. This path is not the path of least resistance for the electrons. Therefore, paths of least resistance that an electron might possibly take (e.g. around the edges of the plates) must be eliminated. One solution is to place an electrically resistant material, such as epoxy, covering the outer, exposed edges of the plates. However, the space between plates is narrow (on the order of one sixteenth ($1/16^{th}$) of an inch) and material on the plate edges would tend to fill in the space and restrict the gas flow from between the plates. The present invention solves this problem using a fan shaped plate assembly in which the edges of the plates are bent away from each other increasing the space between the plates at the ends. This design increases the resistance or what was a path of least resistance on the plates. The increased apace forces the electrons to travel back down to the middle area of the plates where the plates are closer together. The increased space also provides room to add high temperature epoxy along the exposed edges which resists the electrons going around the outer edges of the plates. The fan shaped plates not only eliminate electron paths of least resistance without restricting the flow gas and fluid, but creates a venture effect which forces the gas and fluid to vacate the plate assembly even faster than normal, resulting in higher gas production.

The plates also function more efficiently due to the cooling radiators which further enhance the plates' ability to operate with much higher amperage resulting in higher gas production. Heat causes electrical resistance of a material to increase, therefore the cooler the plates, the faster the electrical current will move through them which makes them more efficient in terms of gas production. Also, the lower temperature reduces the creation of water vapor, facilitating the production of cleaner/dryer gas which is denser, thus more potent when it reaches the combustion chamber. An additional advantage is that the consumption of water is reduced.

Another part of this invention which contributes to the efficiency is the unique delay switch which maintains the FASS fluid at optimum level. The delay switch eliminates frequent activation of the filler pump and allows a wider range of an/off positions making it possible for the user to set exact fluid level ranges and keeping the catalyst fluid at an optimum level. Reducing the FASS's fluid level oscillation to a minimum maintains the catalyst density constant, the FASS operates at a narrower temperature range, also it stabilizes the electrical current flow which translates to maximum gas production with minimal or no water vapor contamination.

The operation of the FASS requires the system to be turned on and off, therefore it heats up and cools down repeatedly. During these heating and cooling cycles the FASS goes through expansion and contraction cycles. Without the expansion chamber these phases of pressure and vacuum would cause stress on all components of the FASS. The pressure and vacuum cycles would create havoc on seams, connections and check valves, resulting in system fluid leaks and inevitably would result in catalyst contamination. The bladder acts as an expansion chamber when the system is operating and as a contraction chamber when the system is shut-off. With the expansion chamber in operative communication with the rest of the FASS, the FASS is less affected by positive and negative pressures.

The FASS disclosed herein is comprised of four major components. Each component is formed by bolting together three separate pieces. In some embodiments, the size of the FASS corresponds to the amount of gas required to be generated, the power to operate the FASS and the available space for installation. Variables may be encountered during design or installation and can depend on the enclosure used to house the system and where the FASS will be used.

The FASS disclosed herein may be used in connection with diesel engines or other combustible engines. It is anticipated that turbine or rotary engines, especially if they were made of ceramic material would be particularly suited for use with the FASS. When used in connection with diesel engines, the present invention is useful to ensure thorough ignition of fuel thus improving fuel efficiencies. This improved (decreased) fuel consumption makes the FASS especially useful for long distance vehicles or stationary engines running constantly.

Diesel engines generally come in two and four stroke systems and are built for a variety of applications but primarily to power cars, RV's, buses, trucks, semi-tractor trailers, farm tractors, cranes, earth moving equipment, heavy mining equipment, trains, yachts, tugs and ships. The FASS can support the engines for all, without limitation, of those applications. The present invention can also be used in connection with combustible engines in a wide range of stationary applications, such as without limitation, small electrical generators, large diesel powered electrical power plants for oil drilling rigs or small towns, large water pumps at sewage treatment plants, irrigation pumps, city water supply systems and electrical power on the grid which maintain constant backup power at electrical generation facilities in case the grid goes off. Other examples of possible uses for the present invention include cutting torches, incinerator and boilers operated with a variety of fuels (e.g. garbage, natural gas, oil and other fossil fuel to power steam generators use to operate steam turbines plus other applications).

DETAILED DESCRIPTION OF THE PREFERRED EMBODIMENT

Figure 1:
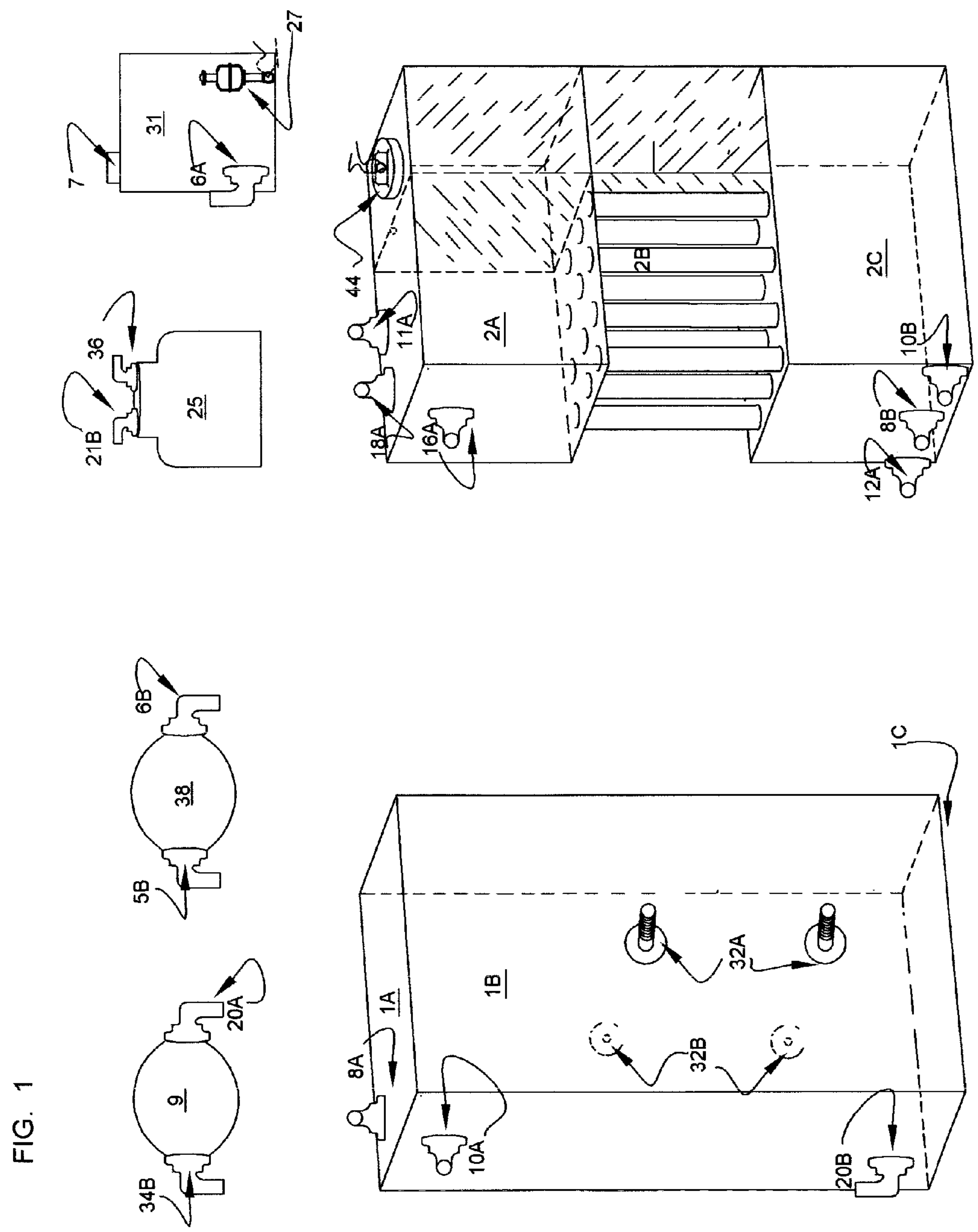
FIG. 1 is the plate casing 1 and cooling reservoir 2.
Figure 2:
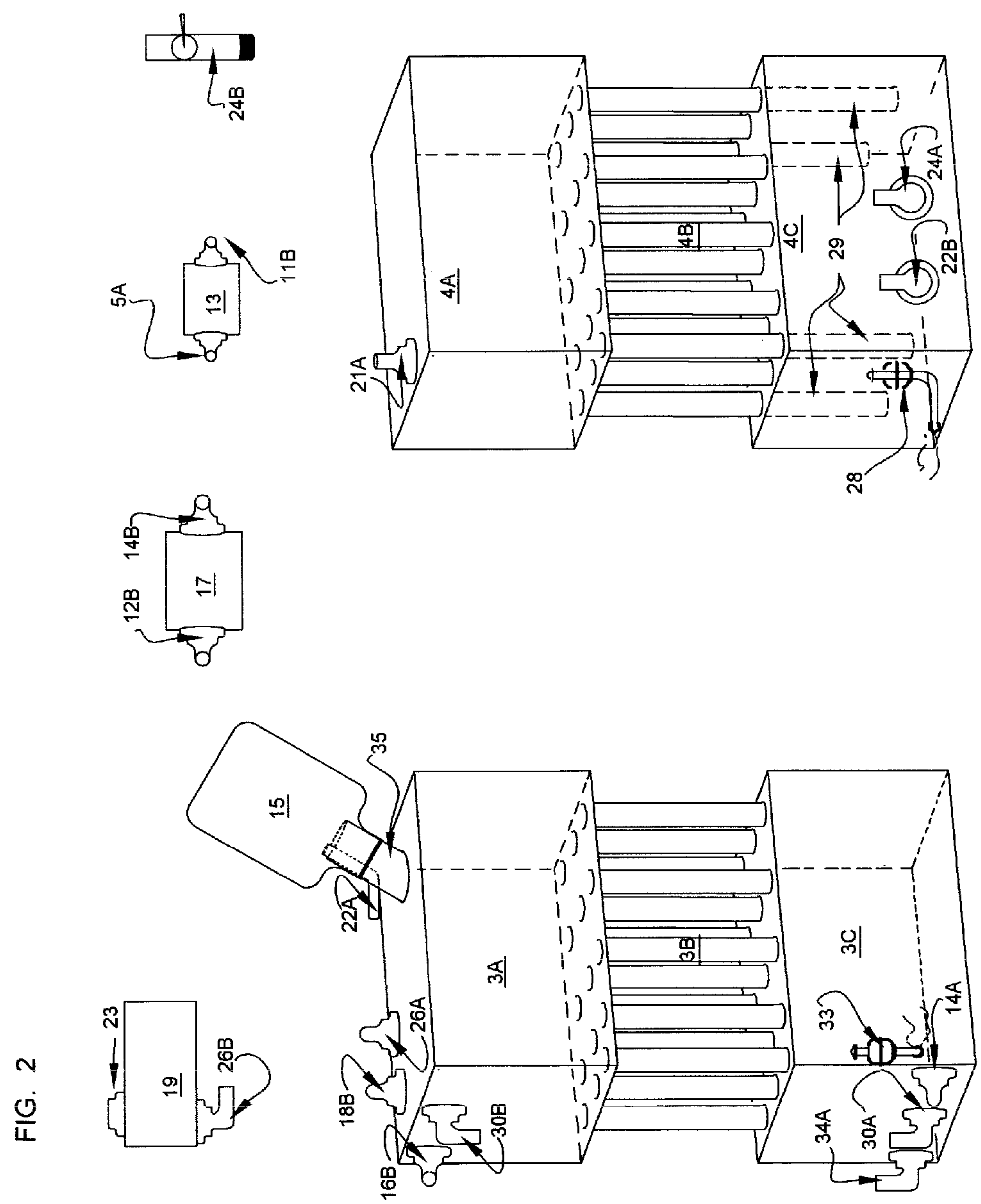
FIG. 2 is the second cooling reservoir 3 and bubbler 4.

Referring to the figures, FIGS. 1 and 2 illustrate an overall view of an example FAS System. The disclosed FASS herein is useful to support a multitude of electrolysis cell composition and design. A major function of this invention is to provide a system which supports an uncontaminated electrolysis process via the prohibition of other elements from intermingling with the electrolytic fluid, without creating excess positive or negative pressures in a FASS operation. Producing gas using the electrolysis of distilled water combined with a catalyst combined with a catalyst of potassium hydroxide generates a combustible gas used to enhance the combustion of practically any fuel. In a preferred embodiment the FASS results in an efficient utilization of electrons generated between the electrolysis plates.

FIGS. 1 and 2 depict one embodiment of the invention that may be implemented. While many materials could be used, the FASS has been successfully implemented using 316L stainless steel, PVC braided hose and nylon plumbing fittings to interconnect the various components of the depicted FASS. Casings illustrated in FIGS. 11 through 21 are welded and bolted together. These separate pieces are all made of heat and corrosion resistant material (i.e. Stainless steel, CPVC, Plexiglas, ceramic, etc.). Stainless steel casings (FIGS. 11 through 21) are generally more expensive during initial manufacturing but are desirable for their recycling properties and to minimize long term expense since such casings (FIGS. 11 through 21) can be used a multitude of times by simply cleaning them out and replacing the electrolysis plates 75 (FIGS. 3 and 4) and hoses used for interconnecting the different chambers. All the chambers and tubes could also be cast as one container, thus, saving space and eliminating the majority of outer connections. Any design with resealable water and air tight openings would accommodate total refurbishment in the field. The shape and size of the casings (FIGS. 1 and 2) used in the illustrated example were selected to accomplish the needs of only one of the many FAS system capabilities, plus to minimize construction costs.

Figure 23:
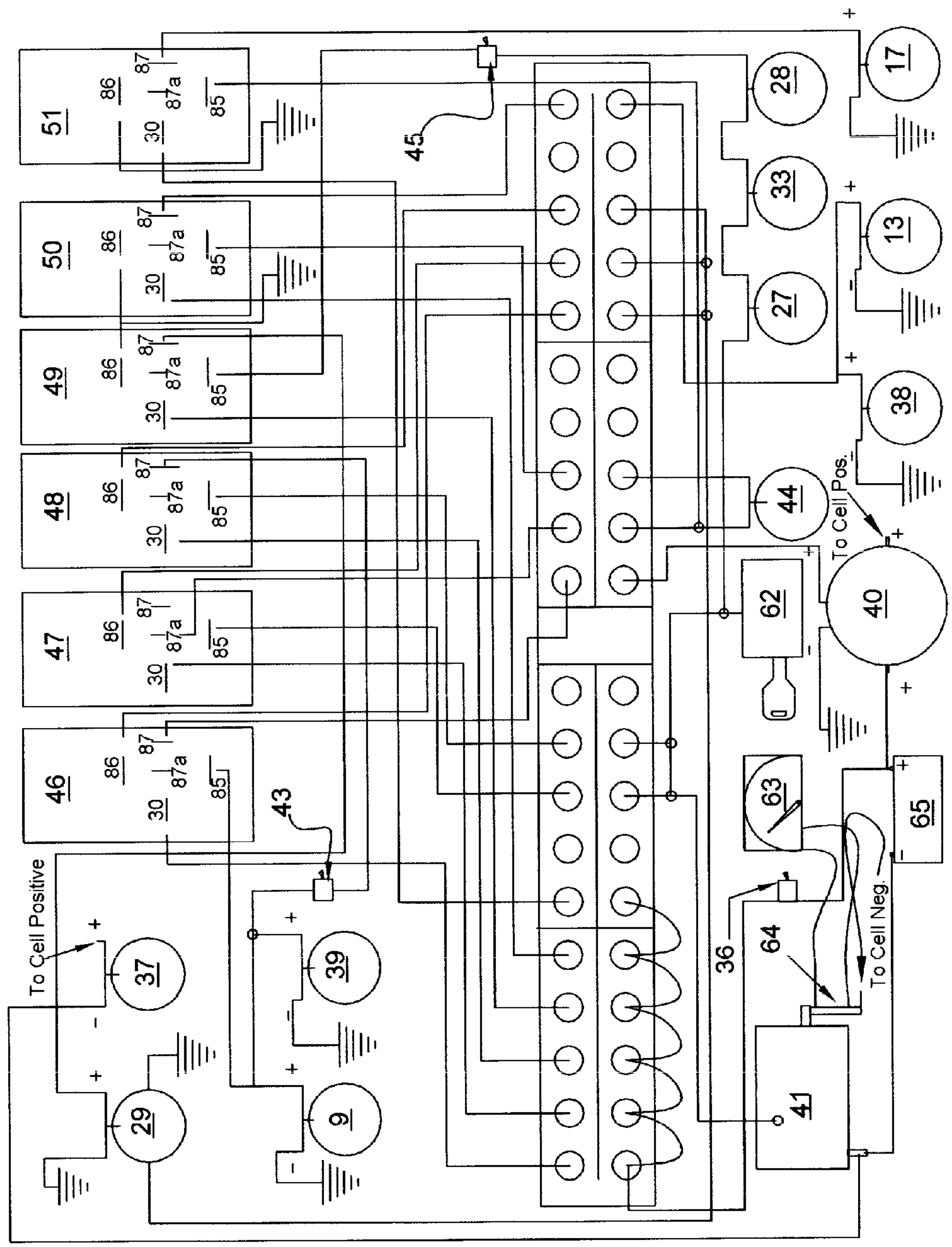
FIG. 23 is an embodiment of a possible wiring diagram in the example FASS.

The electrolysis plates 75 (FIGS. 3 and 4) situated in chamber (formed by sections A, B and C in FIG. 1) are activated when the engine is running via electrical current from such places as the fuel pump or the engine oil pressure sensor or in the case of the semi-tractor the system brake air pressure is used, 62 (FIG. 23). The utilization of these sources protects the alternator by precluding a high amperage demand while the engine is at an idle for an extended period of time. Once the engine is running power for the electrolysis plates 75 (FIGS. 3 and 4) can come from the vehicle batteries and existing alternator, however, vehicle's factory installed alternators that cannot support the electrical demand (especially at night when all systems are working), may be upgraded to an alternator with a 200 or 300 amp capacity. Many independent semi-tractor trailer owner/operators, who have added comfort amenities to their vehicles, already have these alternators installed. However, it should be noted: the electrical demand on the alternators should hover around 70-80% of its capability to prolong their life span.

In one example of use of the FASS, a semi-tractor's factory air conditioning was removed and the AC compressor mounting brackets were modified to support an additional high amp alternator which was solely dedicated to support a separate bank of deep cycle batteries incorporated in the FASS cabinet. An AC/Heat Pump was mounted on the upper rear portion of the cab. This eliminated the need for the truck to idle during the night while the driver rests. This modification resulted in a saving of at least one gallon of fuel for every hour which the truck does not idle. When this design is used, a bank of deep cycle batteries is assigned to the FASS to support all driver amenities while the river is resting via the use of a DC/AC power inverter.

The system starts when electrical current (e.g. 12V DC) is applied to the electrolysis plates (FIG. 7) which initiates a reaction in the distilled water and potassium hydroxide catalyst (or other constituents) producing gas which naturally rises upward. The upward movement of gas is further hastened by fluid being pumped upward by the circulation pump 9 which forces the electrolytic fluid through all three chambers 1(A,B,C), 2(A,B,C) and 3(A,B,C). As the circulation pump 9 forces the fluid throughout the first three chambers it vacates the gas from between the plate 75, the electrons will flow even faster thus resulting in higher gas production.

The gas and water exits Chamber 1(A,B,C) through plumbing fixtures 8A and 10A and enter at the base of Chamber 2 through ports 8B and 10B. The fluid and gas are forced upward through the cooling radiator rubes 2B where heat is expelled. The cooled gas and water continue upward into chamber 2A and exit out ports 16A and 18A. The fluid and gas enter chamber 3(A,B,C) through ports 16B and 18B where the fluid settles and the gas rises into the collapsible bladder 15. The collapsible bladder 15 serves as cooling and condensing chambers. The moisture condenses on the bladder walls and trickles back into chamber 3A. Fluid in chamber 3A drains through the radiator tubes 3B where it is cooled while on its way into chamber 3C. The fluid in chamber 3C is forced out via port 34A by the circulation pump 9 and send out port 20A into chamber 1 via port 20B where the process begins again.

The cooled gas which accumulated in the expansion chamber 15, exits port 22A and enters port 22B at the base of the bubbler 4C, where it rises up through distilled water trapped in the cooling tube of bubbler 4B. As the gas pushes upward it forces distilled water up the riser tubes (in an embodiment of this invention these riser tubes were ⅜" diameter tubes made from stainless steel) into bubbler chamber 4A where the water and gas separate. The water returns down to the bubbler chamber 4C via return tubes (in an embodiment of this invention these return tubes consisted of four ¾" diameter tubes made from stainless steel) located at each corner. To ensure an easy fluid return the tubes are extended further down than the riser tubes. This precludes gas from entering the riser tubes which ensures uninhibited fluid return.

As the gas exits the bubbler 4A through port 21A it travels to the engine air breather. In the air breather the gas mixes with ambient air and enters the piston combustion chamber via the engine intake manifold. In areas with high humidity and high temperature a moisture collection chamber 25 should be added at the lowest part of the gas line which travels to the engine air breather. The moisture collection chamber is especially crucial in freezing weather where moisture can collect and freeze in the line, creating a blockage. However, should this ever happen; the collapsible chamber 15 will burst and preclude any further damage to the rest of the FASS unit.

The FASS operation is complemented by several components. The system fluid level sensing and activation float 44 (shown in FIGS. 1 and 22) located in chamber 2A promotes the filler pump 38 to replenish system fluid. The filler pump 38 solenoid valve 13 prevents catalyst contamination while the filler pump 8 is not operating. The distilled water reservoir 31 provides a source of distilled water to replenish consumed system fluids. The fluid level sensing float 33 (shown in FIG. 2) in the chamber 3C precludes the FASS from running itself empty. The reservoir chamber 3C leveling valve 17 located between reservoir chamber 2C and reservoir chamber 3C ensure the system operates safely and prevents catalyst contamination. The catalyst Tank 19 facilitates replenishing the catalyst in the field if necessary.

The filler pump 38, (shown in FIG. 1) and the filler pump valve 13 and the fluid leveling solenoid 17 are designed to function only while the FASS is not operating. The moment the FASS is deactivated the fluid leveling solenoid 17 activates and allows fluid to drain from chamber 2A,B,C into chamber 3A,B,C until they are level with each other. The transfer of fluid (if low enough) may be sensed by the fluid level sensor 44, (shown in FIGS. 1 and 22) which simultaneously activates the filler pump valve 31 and the filler pump 38. The filler pump valve's 13 main purpose is to prevent catalyst from being pushed through the filler pump 38 and into the distilled water reservoir 31. These three components maintain the FASS catalyst fluid at an optimum level.

Figure 3:
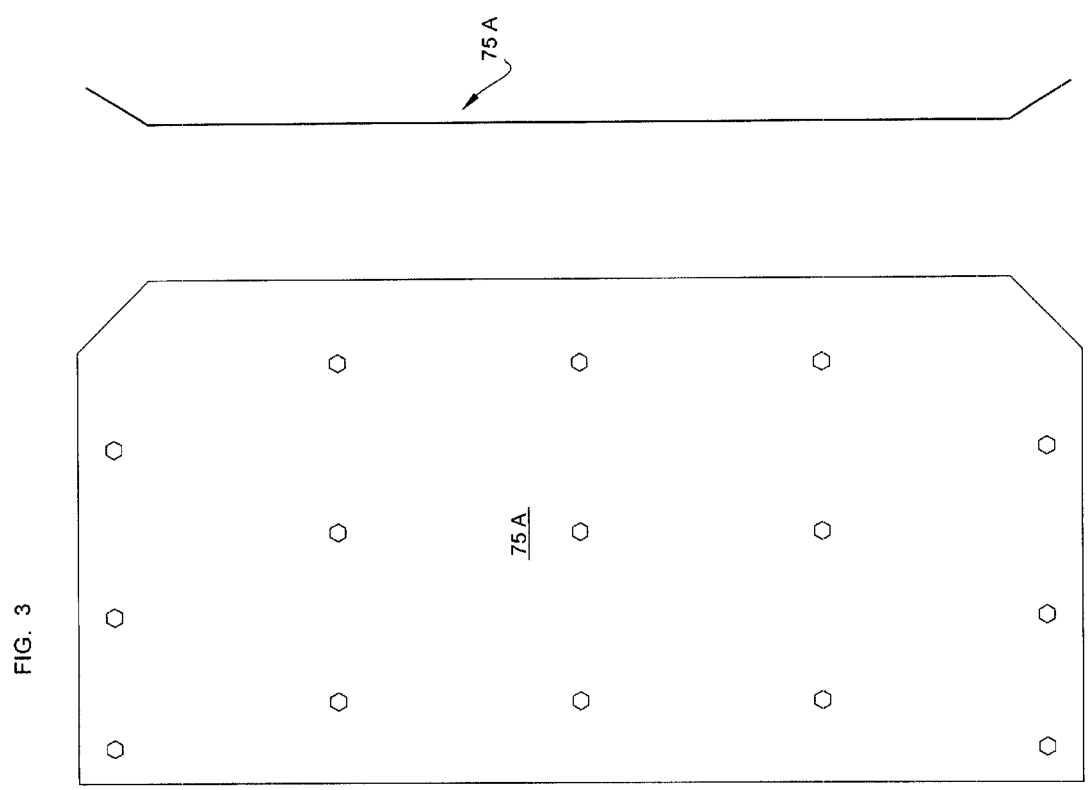
FIG. 3 depicts the plate 75A (cathode and/or anode), frontal view and side view after it is bent to form the fan design.
Figure 4:
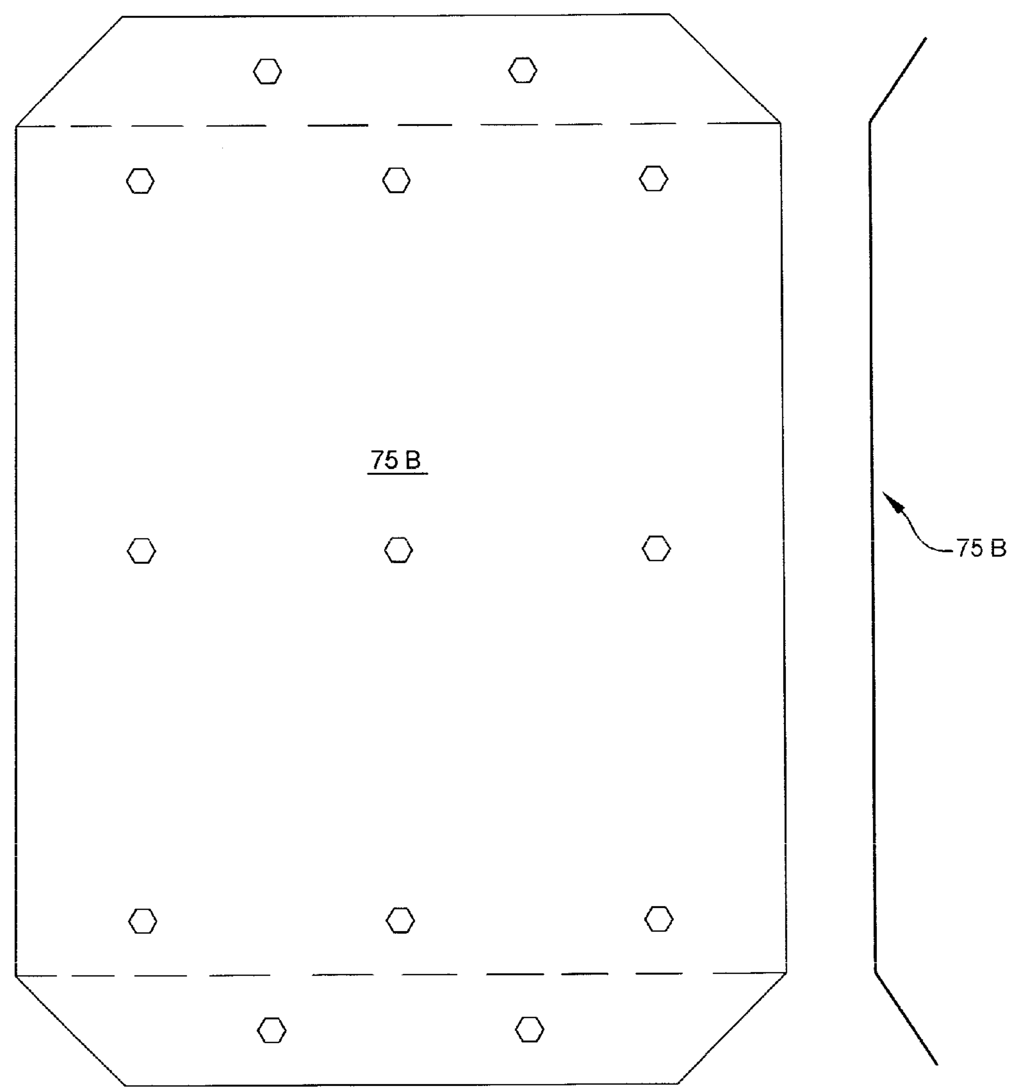
FIG. 4 depicts the neutral plate 75B, frontal view and side view after it is bent to form the fan design.
Figure 5:
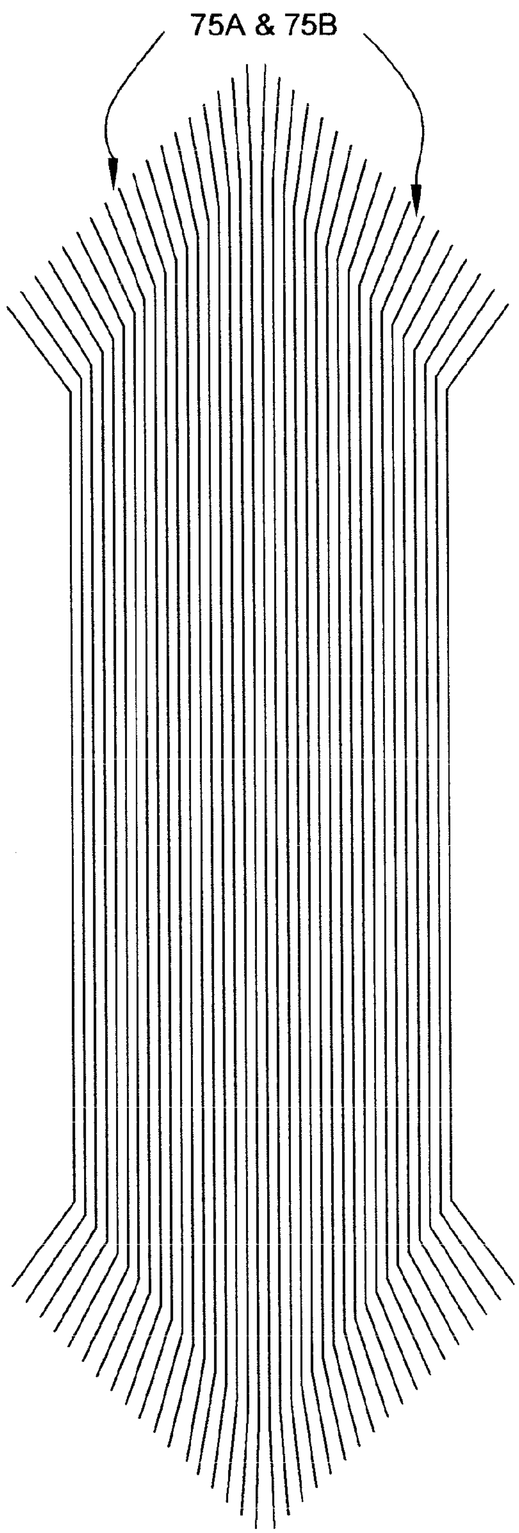
FIG. 5 shows a side vertical view of stacked plates 75.

FIGS. 2 and 3 show center plates 75A (cathode and anode) and plate 75B (neutral). From the center out successive plates 75 diminish in size in a sort of fan-shape. In one embodiment, the decrease in size as in increments of a ¼". Note 75A (FIG. 3) has only two corners out (a one inch isosceles forty five degree triangle, while the plate 75B (FIG. 4) has four corners removed. Plate 75A is a negative (cathode) or a positive (anode) (flip front to back to change polarity). Plate 75B is a neutral. Once the plates are cut and drilled, each electrode according to their position on the stack is bent starting in the center out each electrode is bent approximately two degrees (second plate is two degrees plus two, the third is 4 degrees plus 2 degrees and so on and so on). The stacking of plates for the example FASS is +NNNN−NNNN+NNNN− for a total of 37 plates 75.

Figure 6:
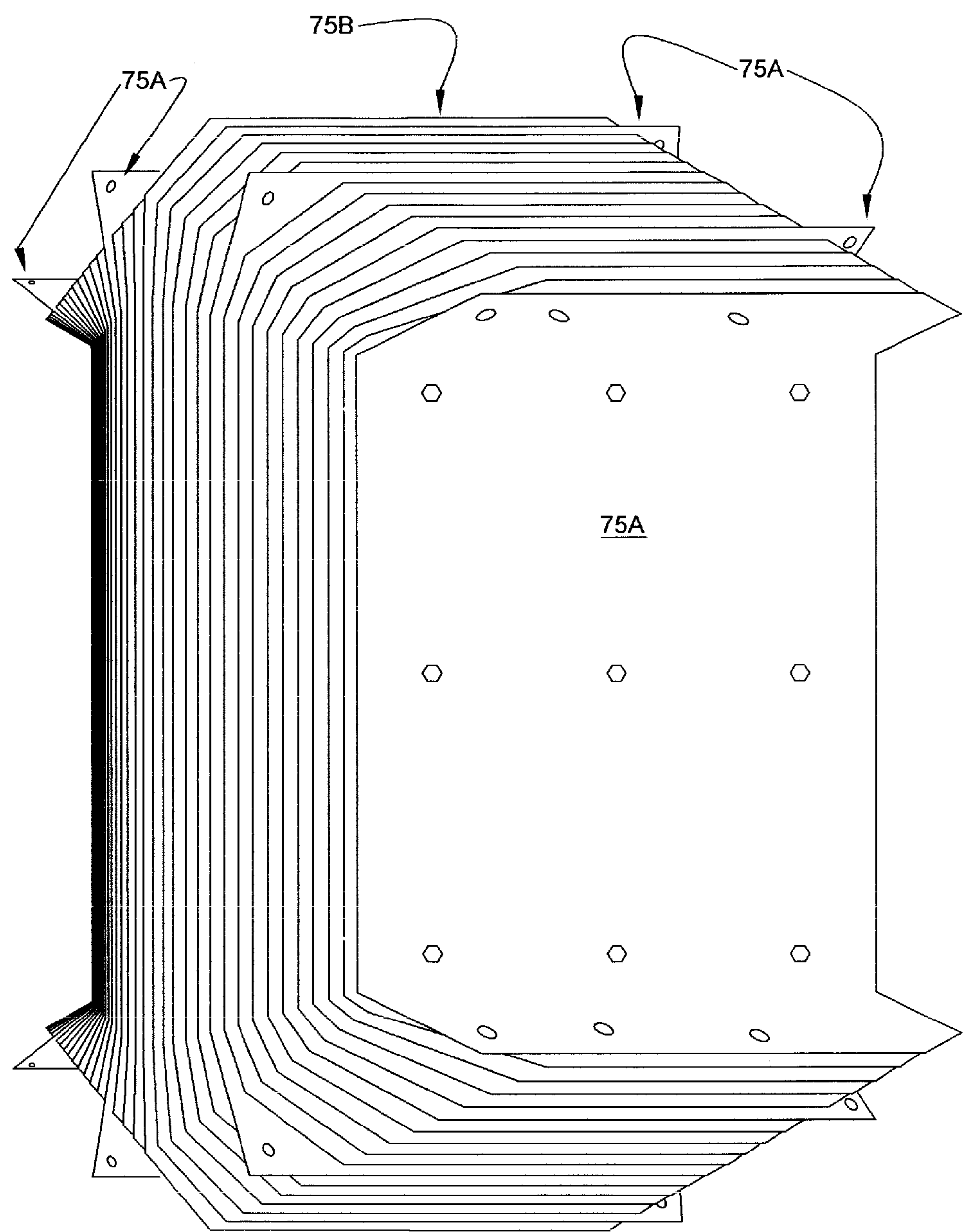
FIG. 6 is a 45 degree view of stacked plates 75.

The holes (in an embodiment there were nine (9)¼" holes) in the center of FIG. 3 are used to hold the plates in place until the spacer (e.g. ½" Plexiglas) 76 (shown in FIG. 7) is cemented together. The two holes shown in FIG. 3 on the top and bottom of the plates 75 are used to ensure the outer spacing (e.g. ⅛") remains constant FIG. 3 shows an end view of the stacked plates in a vertical position. FIG. 6 shows the stacked plates from a forty five degree angle. This will aid the viewer in understanding the plate arrangement. Also, it is necessary to see the venture design of the plates to appreciate the total design.

Figure 7:
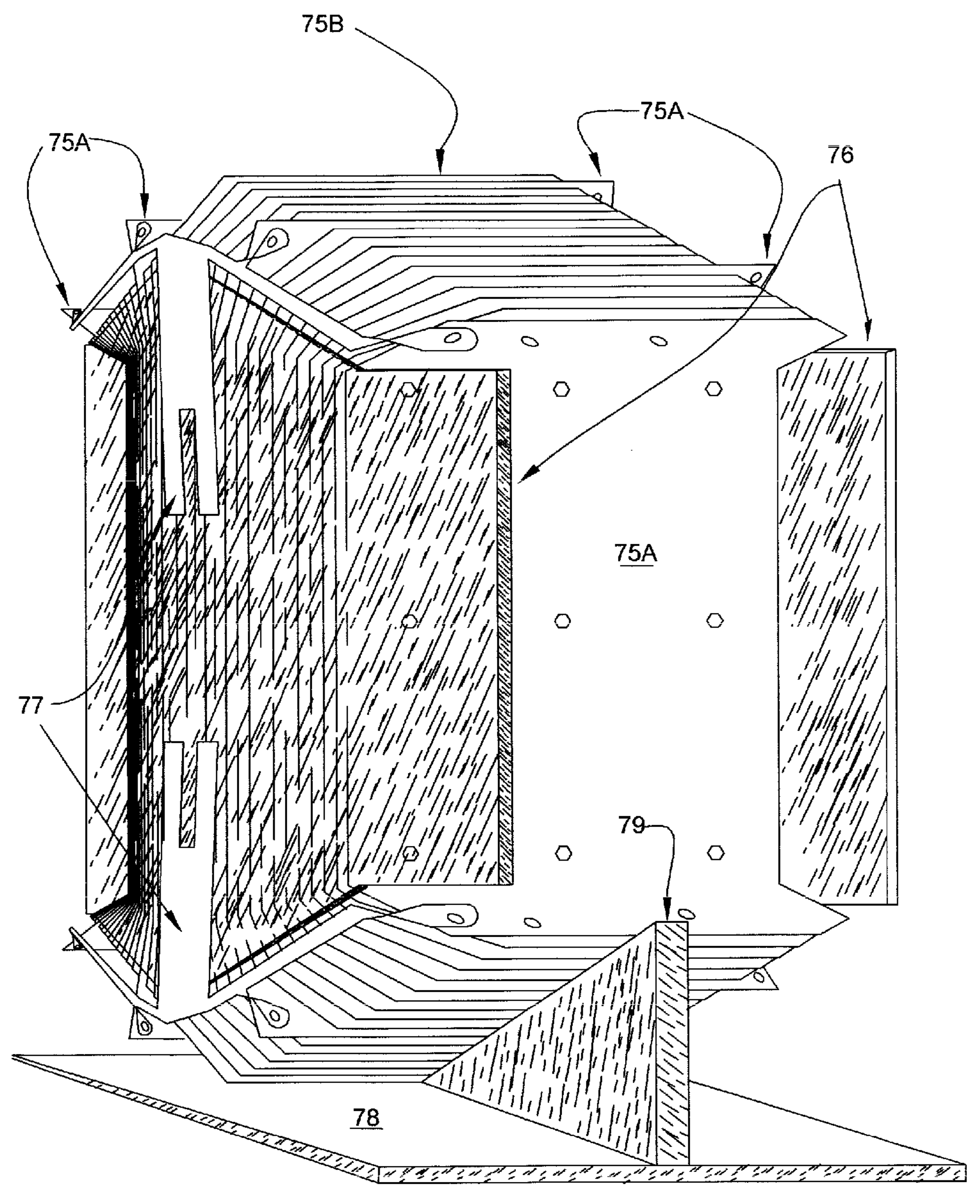
FIG. 7 depicts plates encased with Plexiglas 76, and the Plexiglas pedestal 78 and 79.

FIG. 7 shows the stacked plates adhered to the outer (non-electrical conductor plate, e.g. Plexiglas) plates 76. These plates serve two purposes. They seal the edges of the plates 75 to prevent electron leakage, and they form a barrier to keep the fluid being pumped by the circulation pump 9 between the plates 75 to force the gas out from between the plates 75. The spacer panels are wedged between chamber 1's outer walls to eliminate vibration. The top of these plates are used to attach a fluid flow resistor at the top portion of the chamber 1A thus forcing the fluid to go between the plates 75.

Also shown in FIG. 7 are Plexiglas mounts 78 and 79 at the bottom of the stack at plates 75, which mounts 78 and 79 act as support, electrical insulator and anti-vibration platform. This platform is also wedged between the walls of chamber 1 to prevent vibration.

Figure 8:
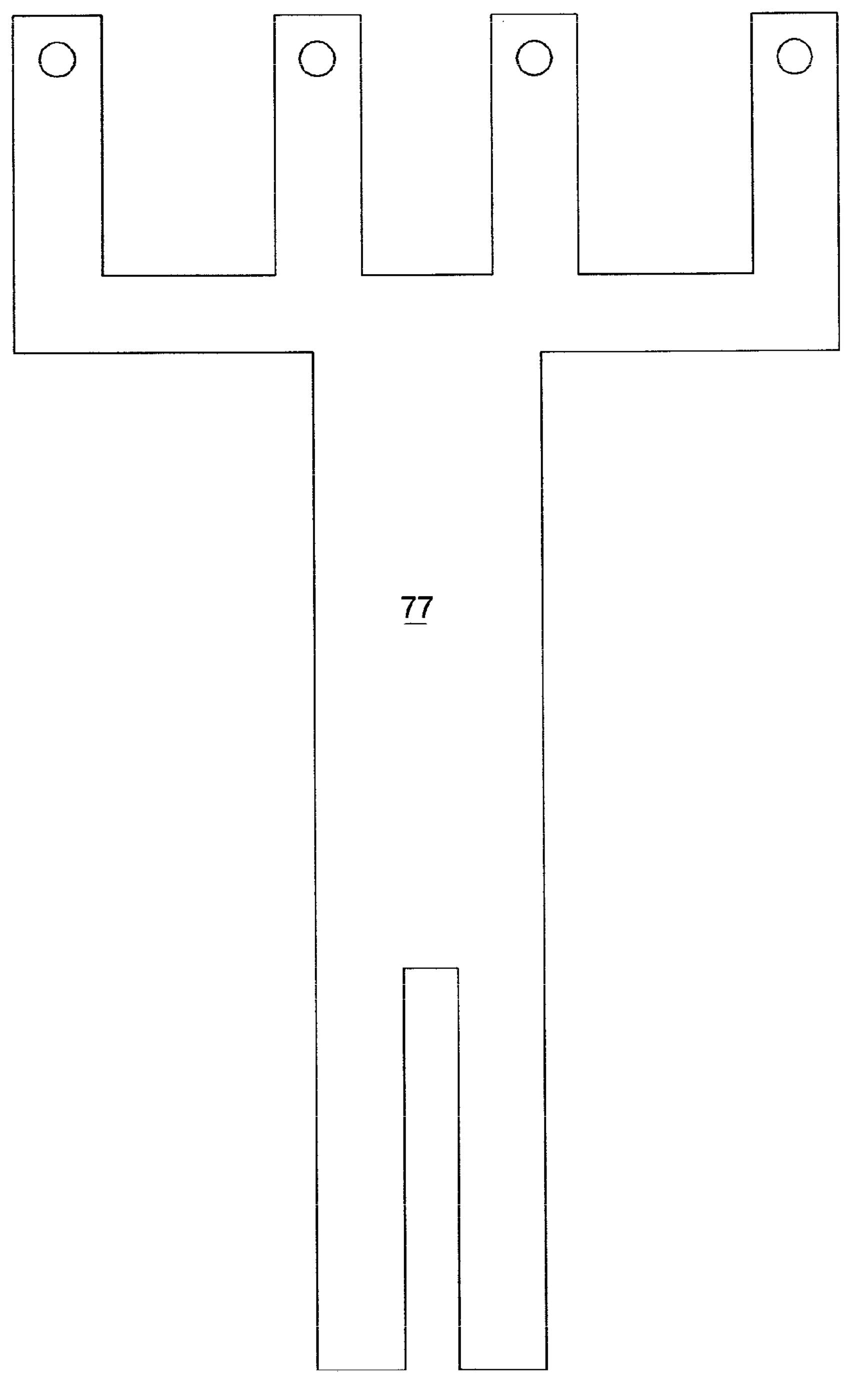
FIG. 8 shows power connector 77 for plate cell.
Figure 9:
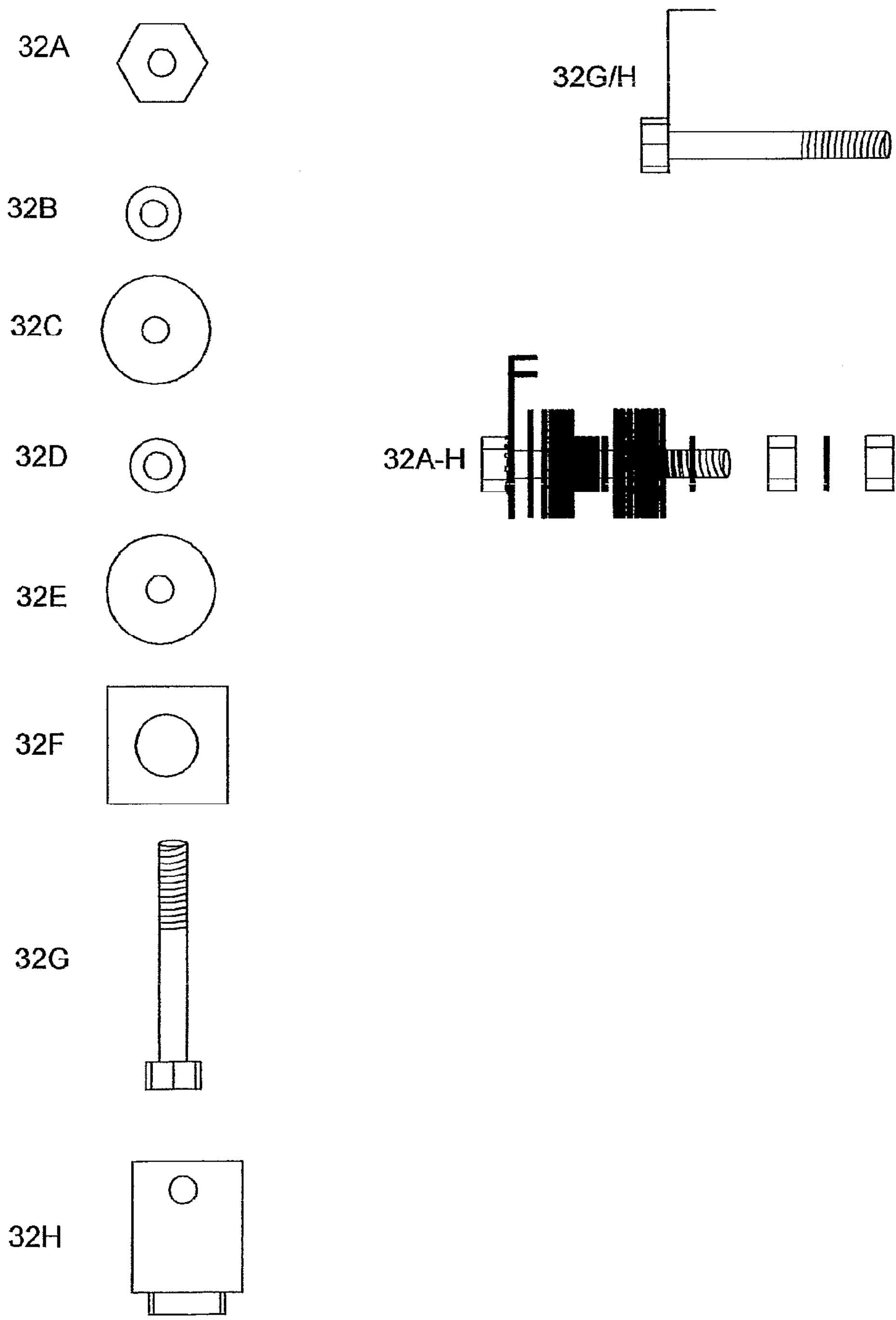
FIG. 9 shows plate cell casing power connector 32 and casing insulators.

FIG. 8 depicts electrical connectors (dog ears) 77 which provide electrical current to the plates (anodes) 75 and the plates (cathodes) 75. The dog ears can be formed in two pieces and TIG welded together or they can be cut out of pieces of metal. They attach to item 32 (A through H of FIG. 9) on the outer edge of the HHO housing chamber casting 1B. Items 32 (A-H) have a multi-purpose. They not only connect the welding cable for the ground and positive connectors, they also provide a water proof seal and electrical insulator via the 32 (C, D and E). The water proof seal allows the connector to exit below the water surface which helps them to remain cool in spite of the 100 plus amps which are fed across these connections. The modified bolt 32G/H is designed to lock in place, facilitating the torque necessary to form the water proof seal.

Figure 10:
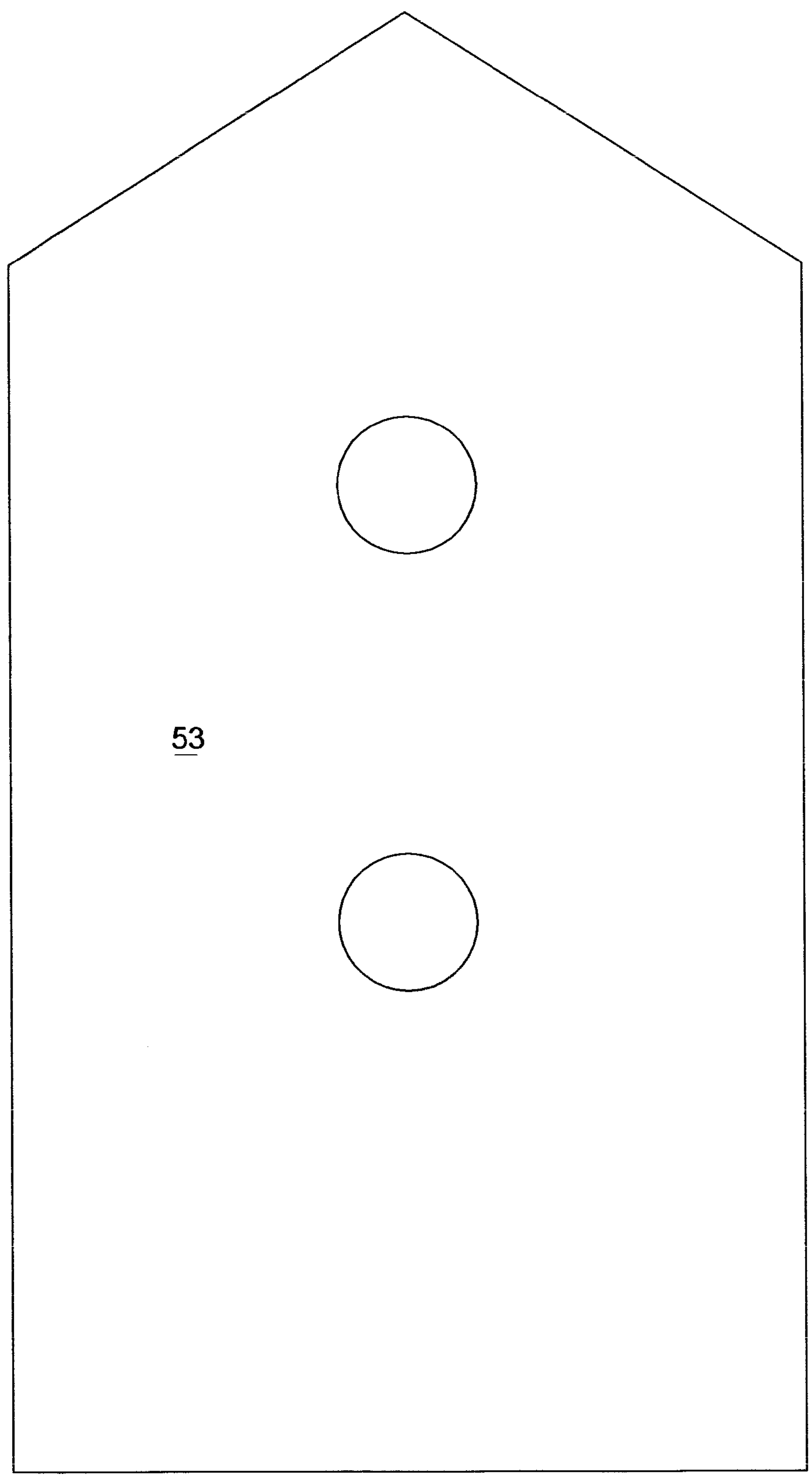
FIG. 10 shows the power connector non-conducting casing wall insulator 53.

FIG. 10 shows the panel 53 (e.g. can be made from ¼" Plexiglas) is used to insulate the dog ears from the outer casing and still allow connector 32 to exit the unit 1B casing. This panel also serves to support the fluid barrier at the top end of 1B mentioned above in conjunction with spacer 76 which forces the catalyst fluid to go between the plates 75.

Figure 11:
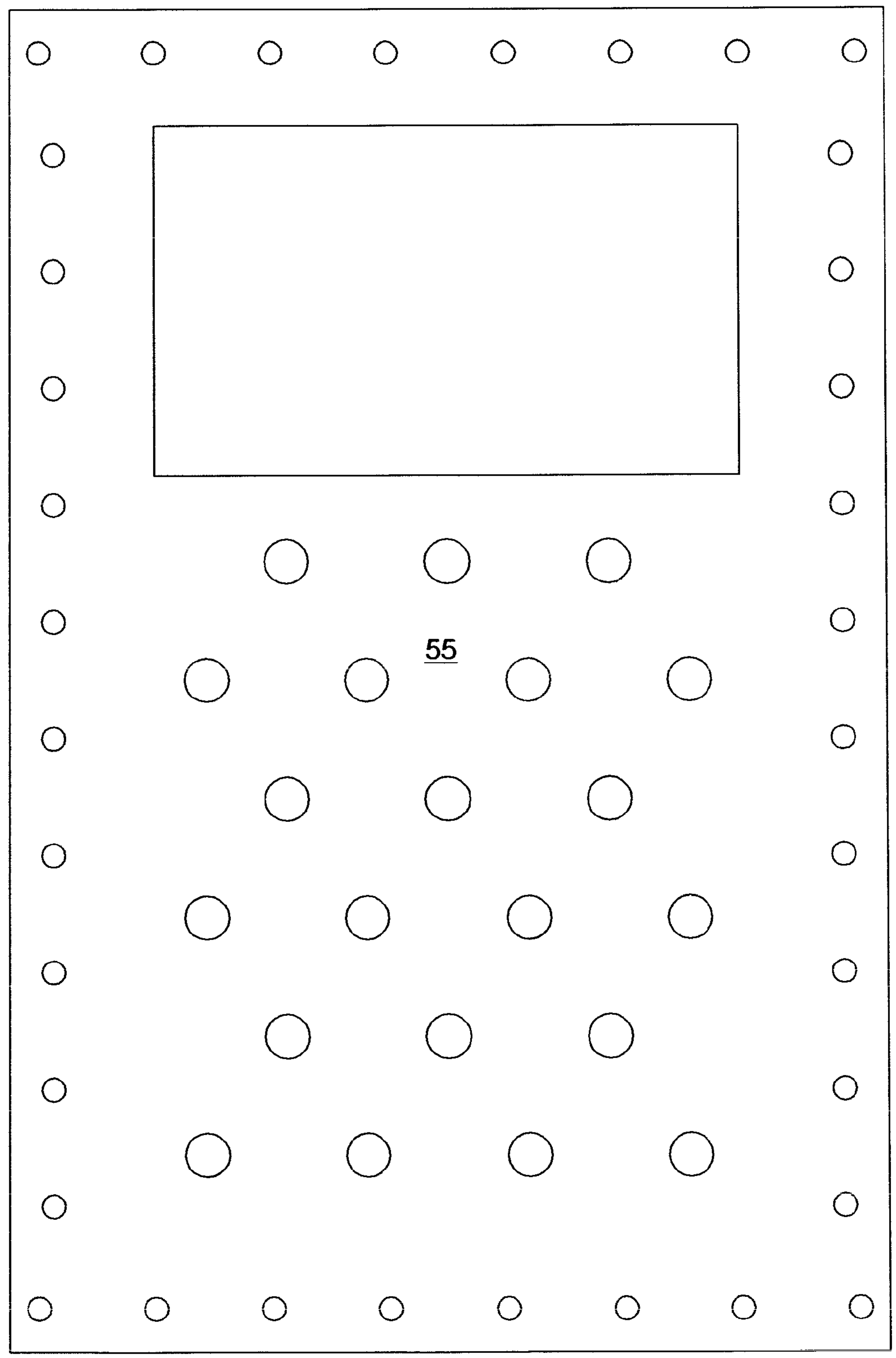
FIG. 11 shows the cooling radiator upper and lower plates 55 for section B for the first cooling chamber.

FIG. 11 shows the top and bottom plates for the center pieces of the cooling reservoir 2 and chamber 2B which form the cooling radiator for fluid and gas. The two plates 55 form the upper and lower parts of reservoir 2B which are interconnected by the riser tubes, plus rectangular housing (e.g. 3"×5"×6") which houses the fluid level float switch 44 (FIG. 1). Note on FIG. 12A there is a wall tacked in to minimize the fluid flow around the radiator cooling tubes in 2B via the housing for item 44.

Figure 12:
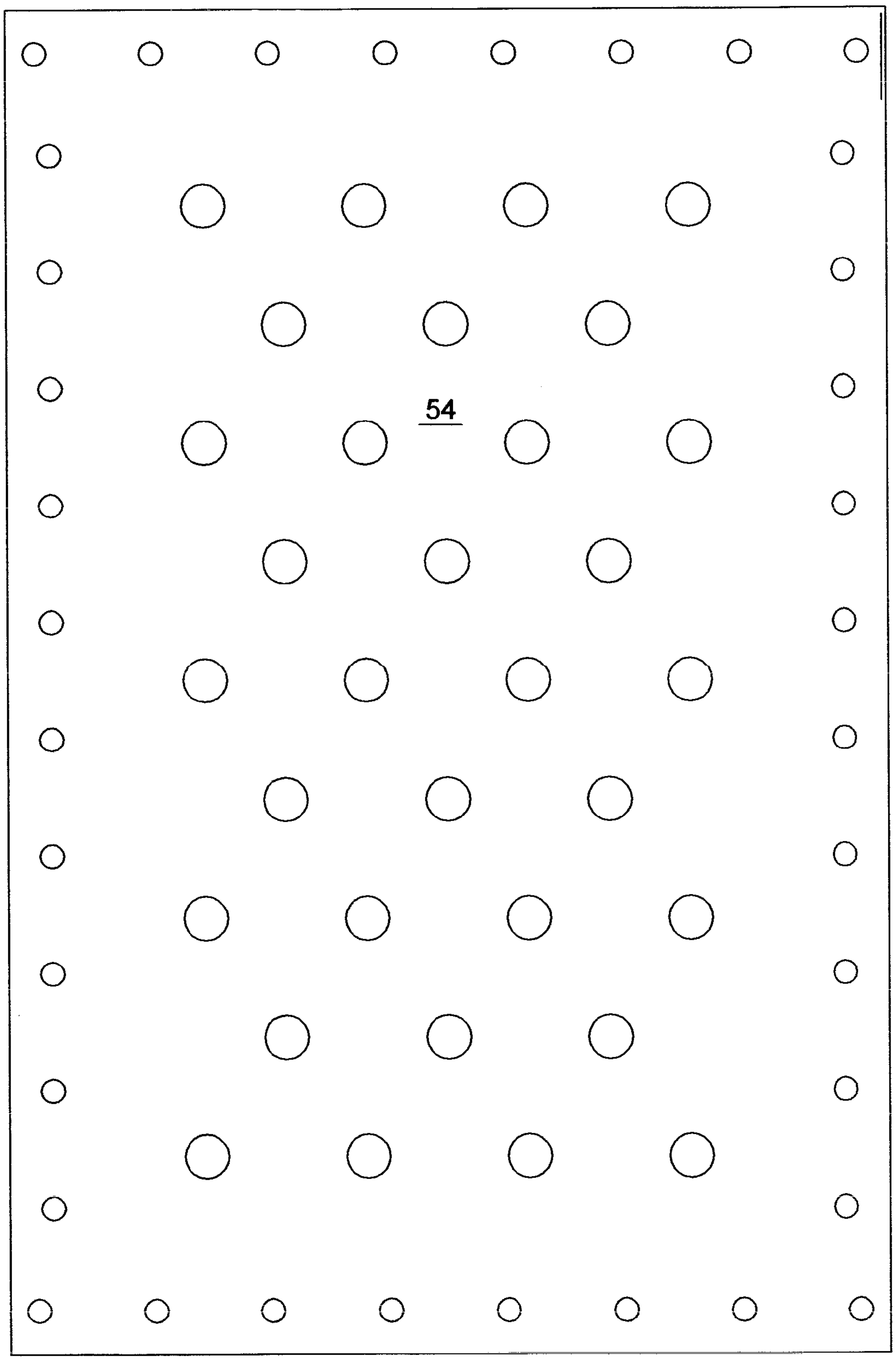
FIG. 12 shows the cooling radiator upper and lower plates 54 for section B of the second cooling chamber.

FIG. 12 shows the top and bottom plated for the center pieces of cooling reservoir 3 chamber 3B which are interconnected by the riser tubes to form the cooling radiator for the fluid and gas.

Figure 13:
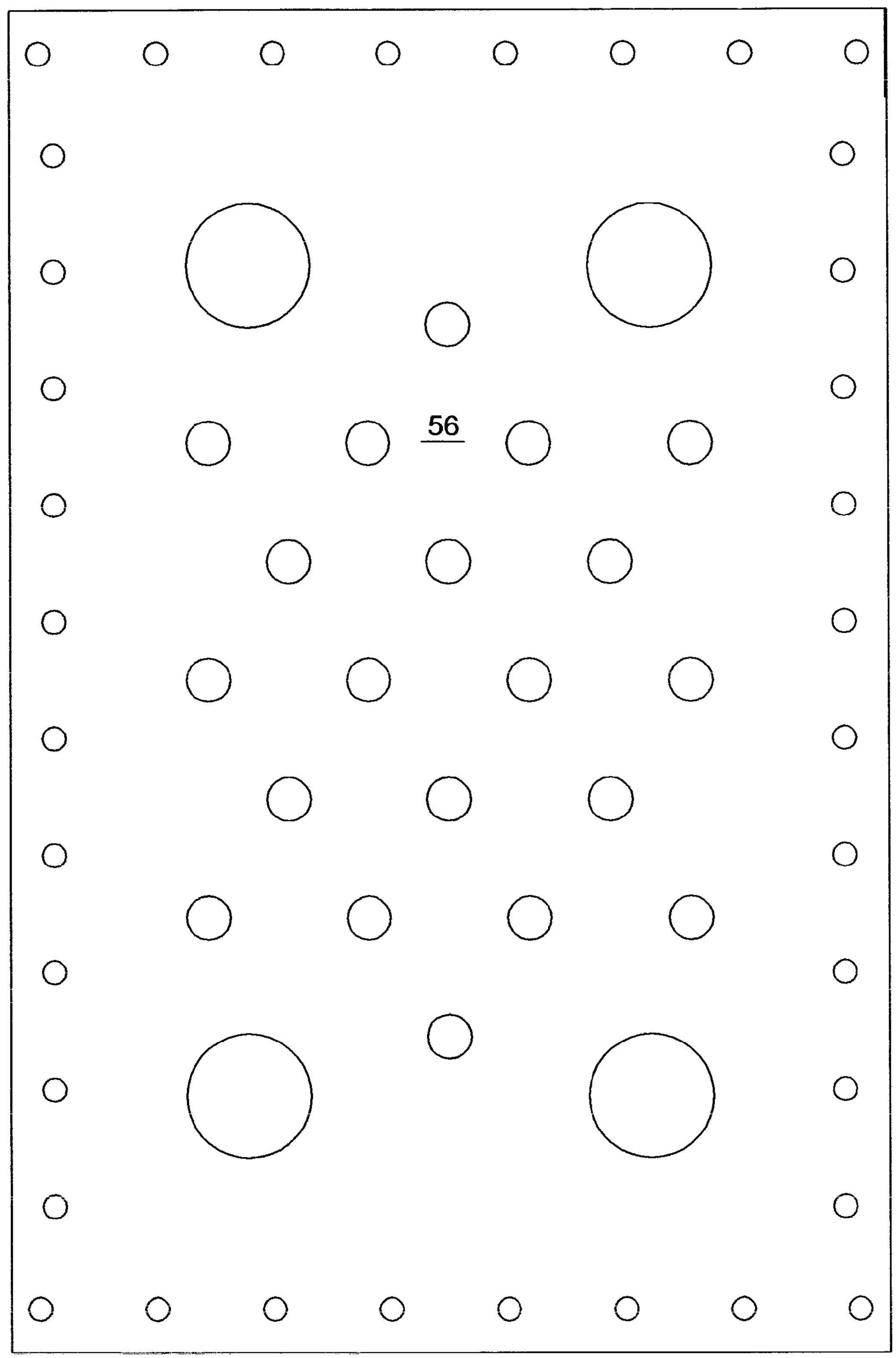
FIG. 13 shows the cooling radiator upper and lower plates 56 for section B of the bubbler.
Figure 14:
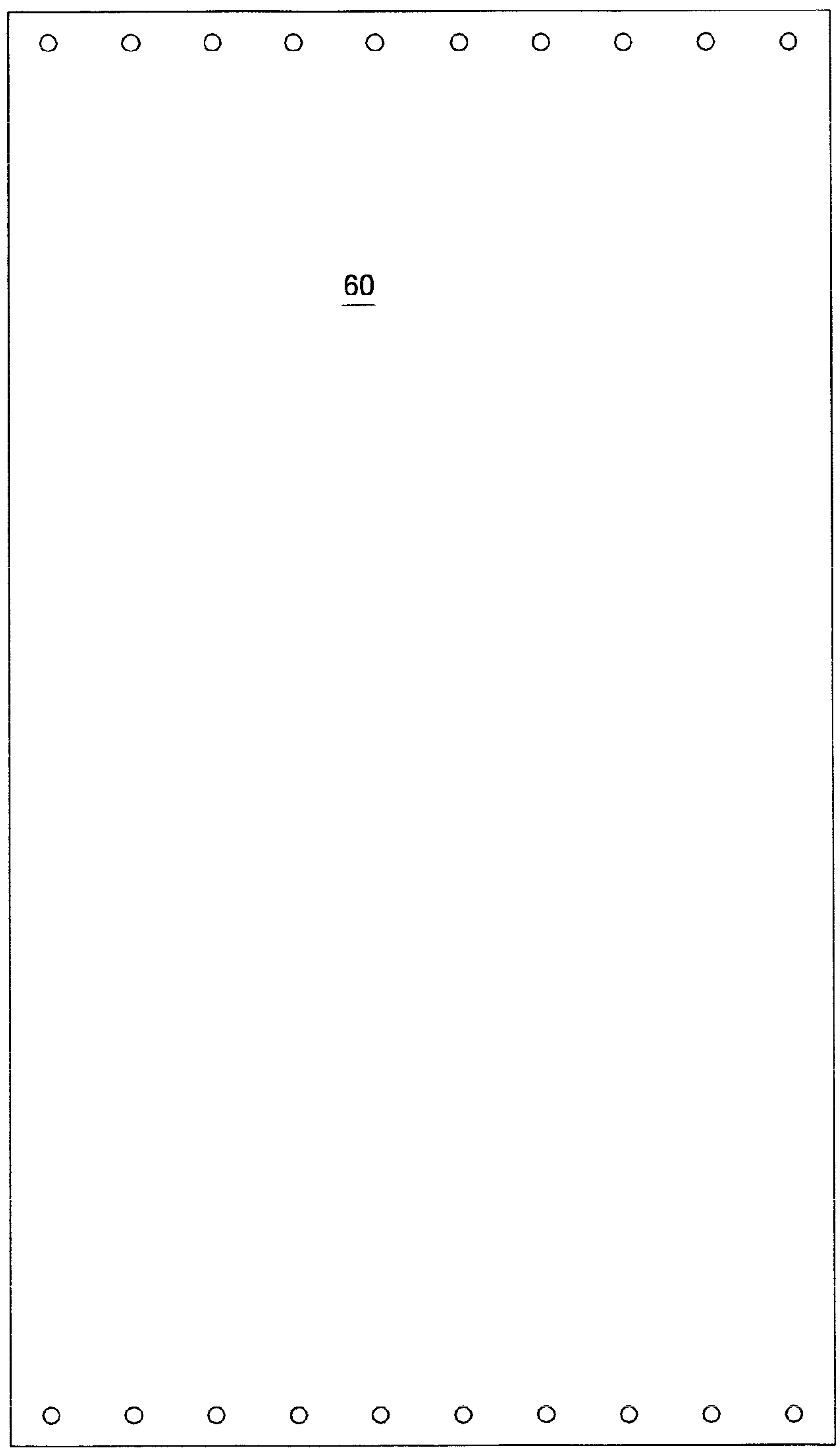
FIG. 14 is the main casing plate 60 or reservoirs (A & C) and bubblers (A & C).
Figure 15:
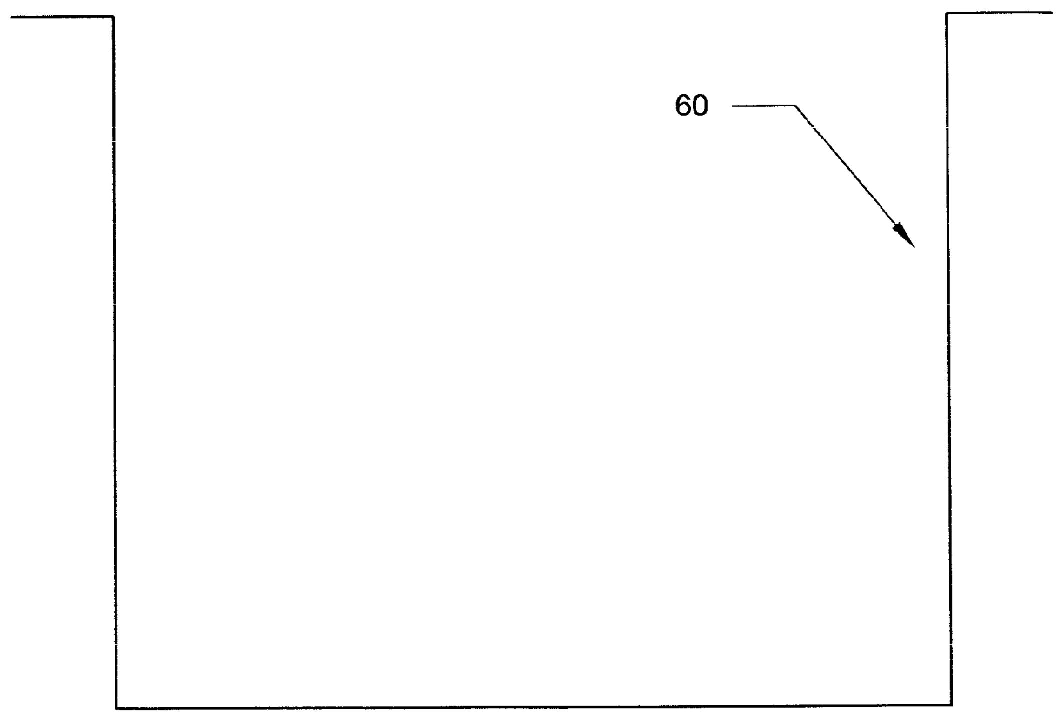
FIG. 15 is the center portion of reservoirs and bubbler casing 60 (A & C) after it is bent to form the trough.
Figure 16:
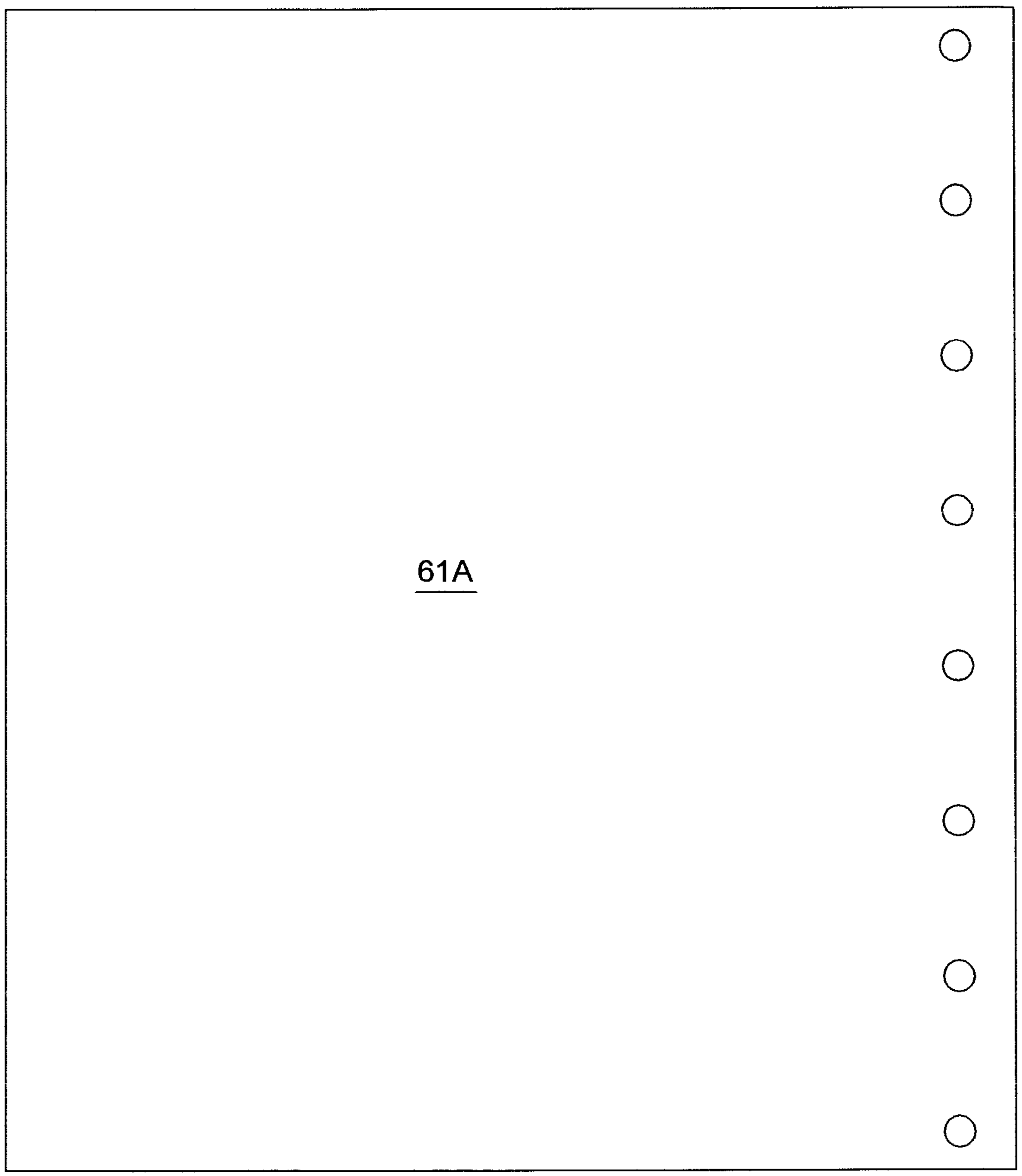
FIG. 16 is plate 61A for end cap for reservoir/bubbler casing before being cut and bent.
Figure 17:
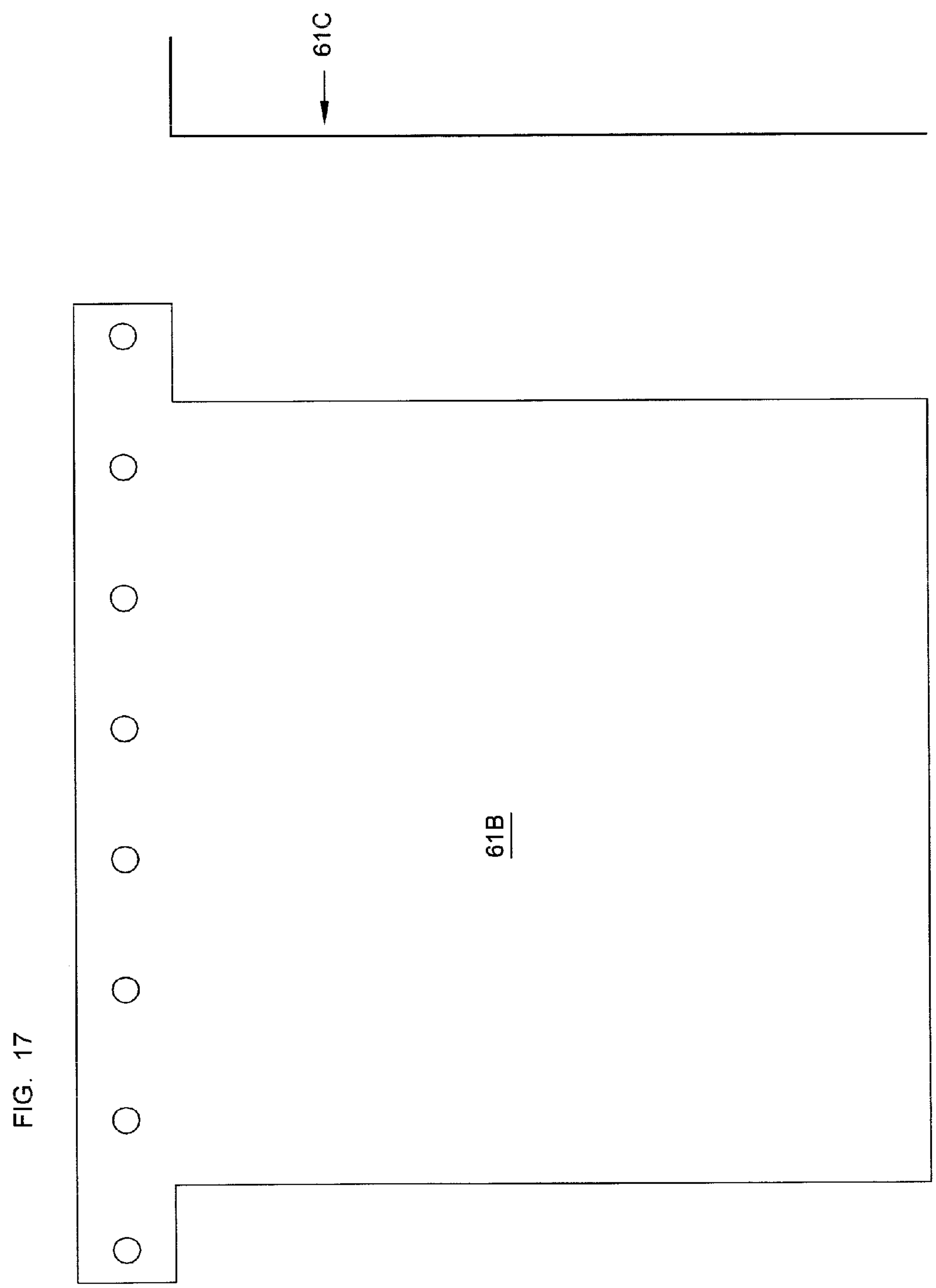
FIG. 17 shows plate 61C (FIG. 16) after plate 61 has been cut (61B) and bent (61C) to form the end caps which are welded onto the ends of FIG. 15.
Figure 18:
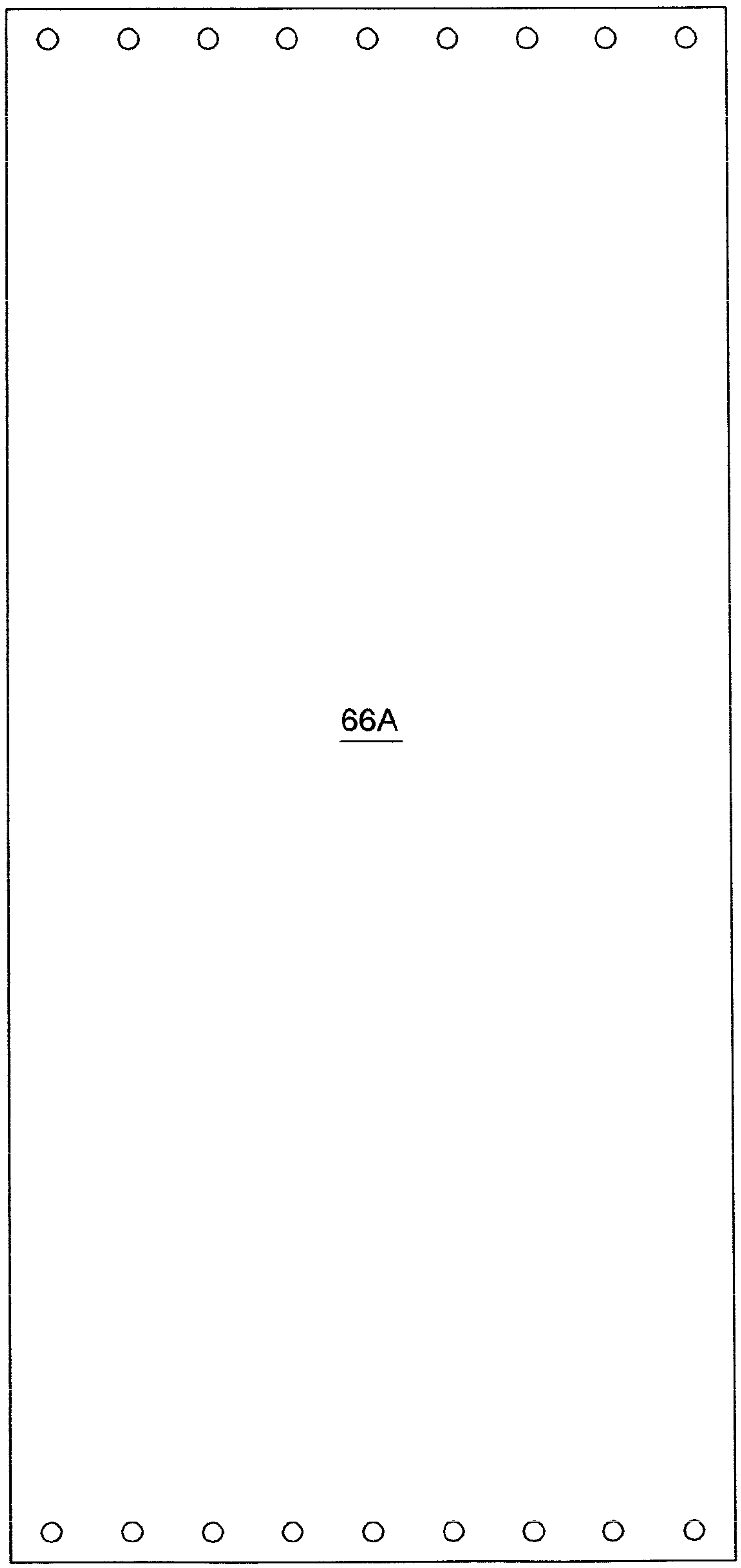
FIG. 18 is a side wall for plate casing prior to being bent (2 each).
Figure 19:
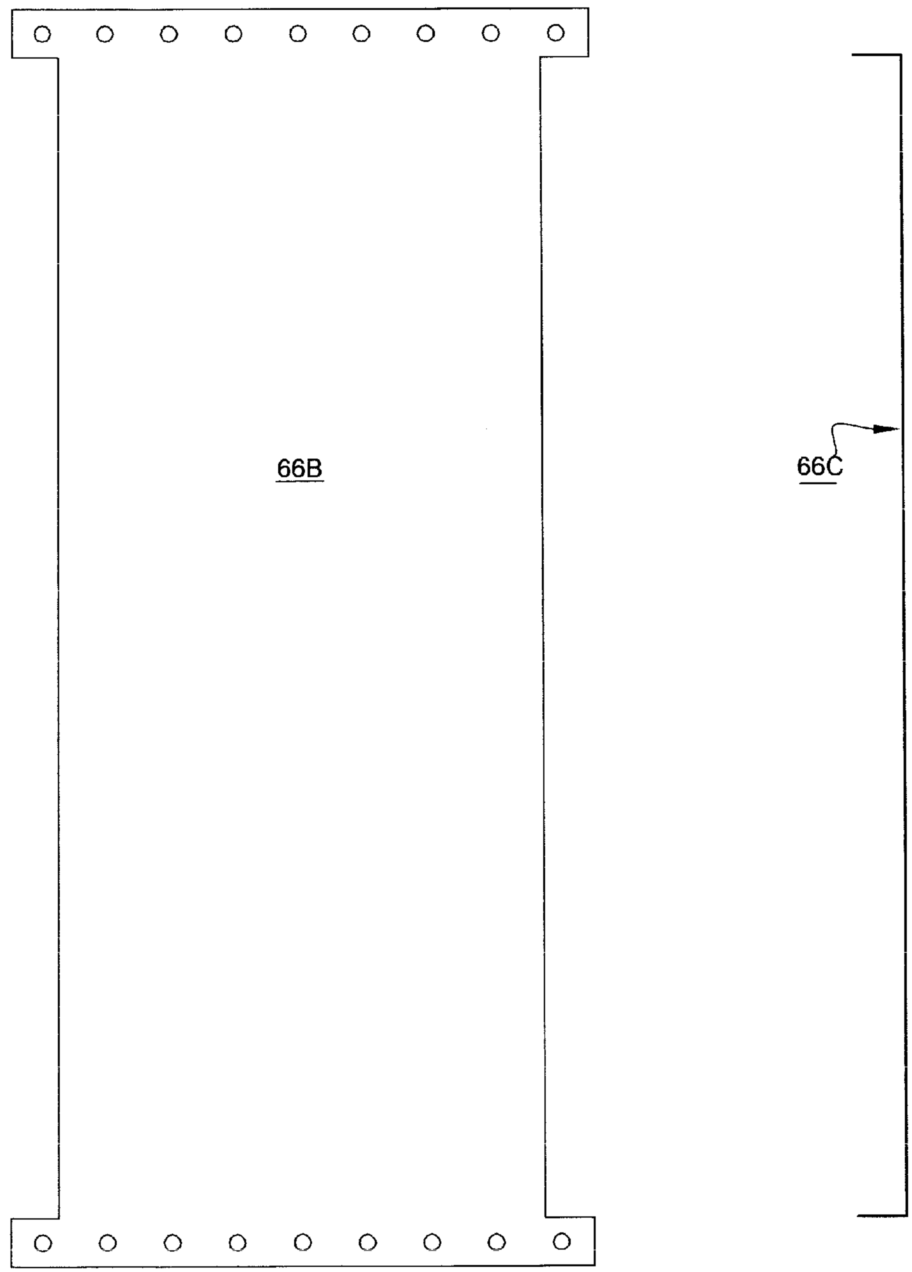
FIG. 19 is plate 66A the same as FIG. 18 after it has been notched and bent (2 each) 66B.
Figure 20:
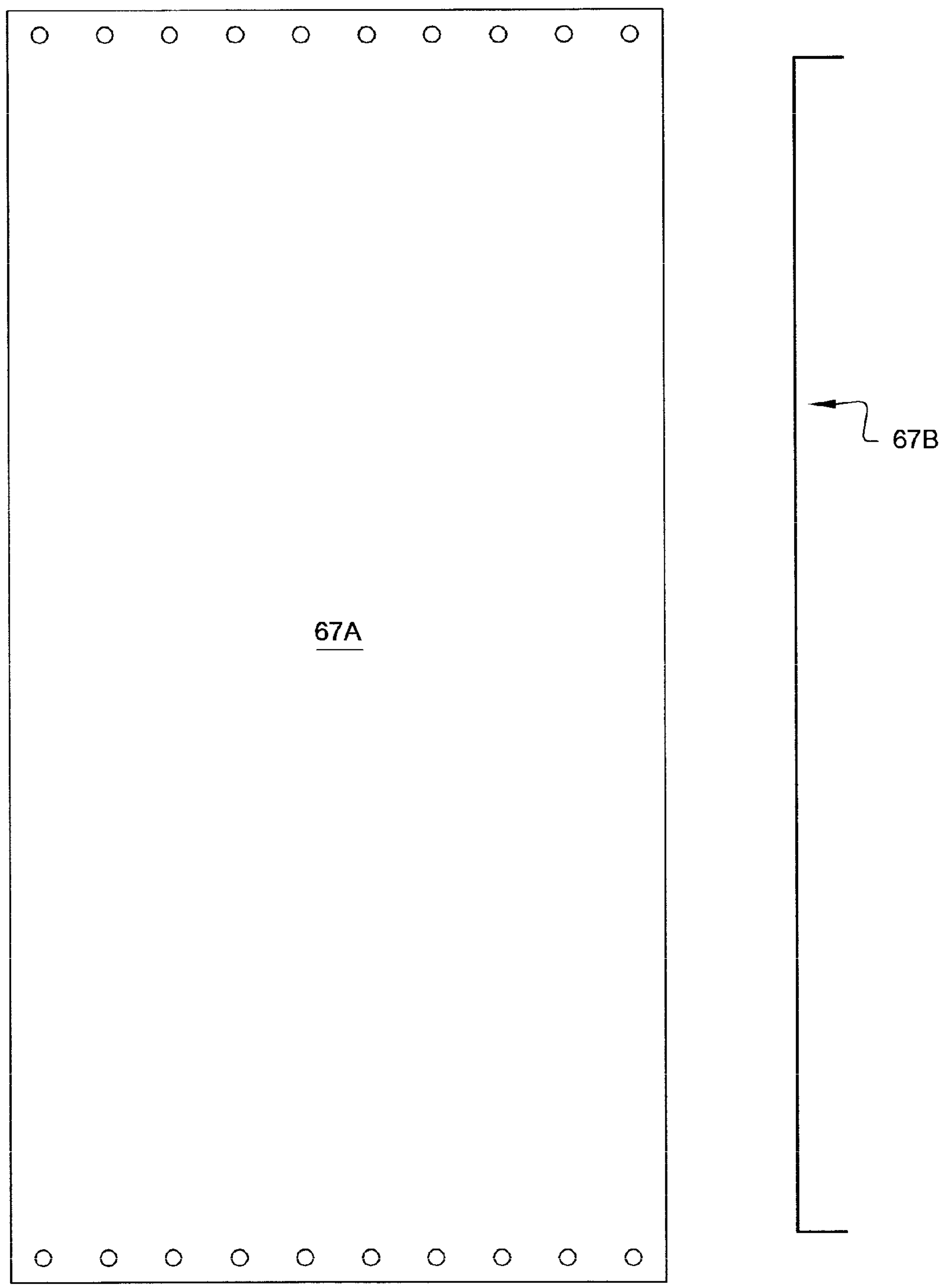
FIG. 20 is a figure and plates 67A, 67B (2 each) which are welded to FIGS. 18 and 19.
Figure 21:
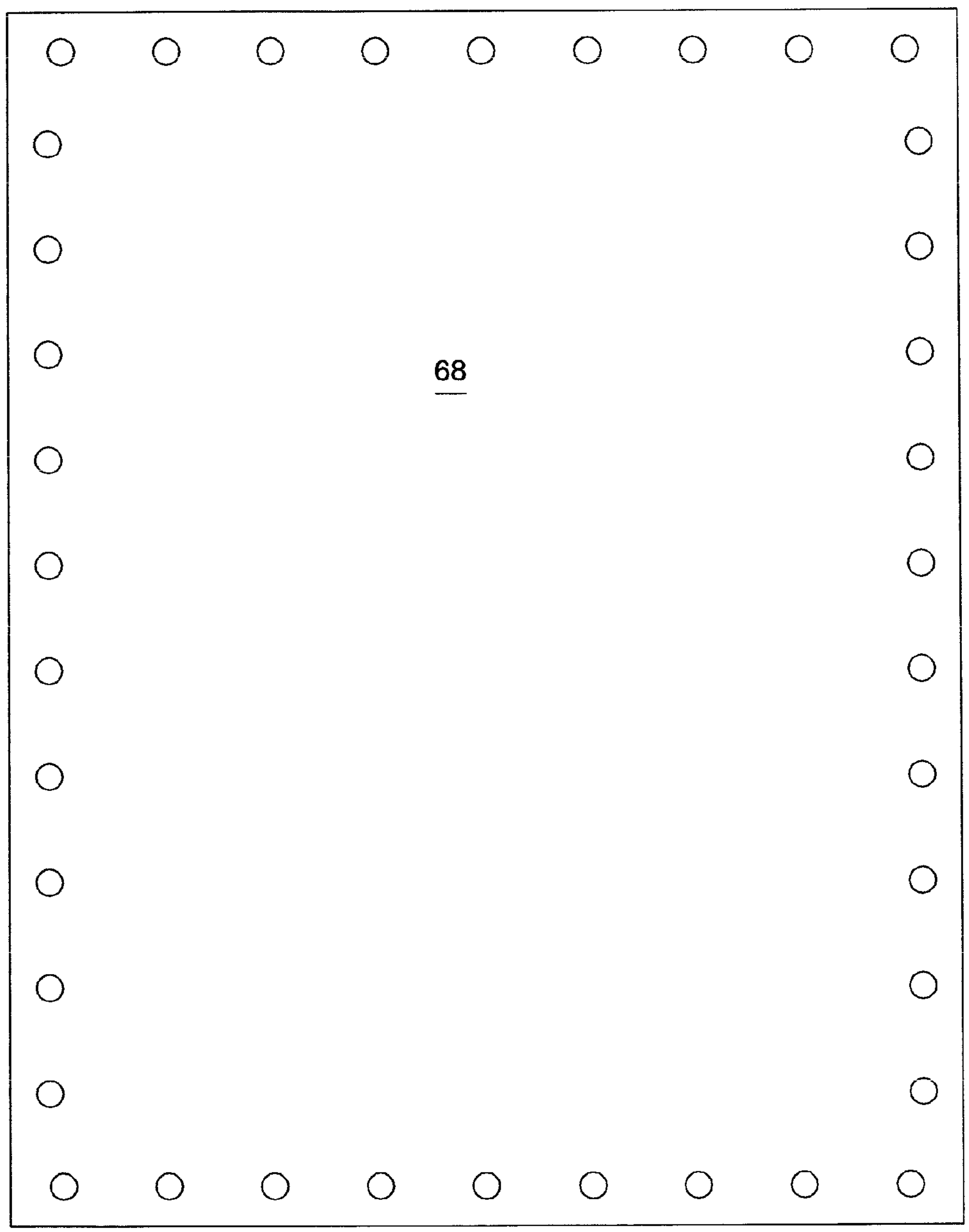
FIG. 21 shows end cap 68 (two each) of plate casing bolted to FIGS. 18, 19 and 20.

FIG. 13 shows the top and bottom plates for the bubbler's 4 cooling reservoir section 4B which are interconnected by the riser tubes to cool the gas prior to traveling to the engine air intake filter.

FIGS. 14, 15, 16 and 17 depict the individual pieces which are welded and bolted together to form the chamber 1 for the HHO generator (FASS).

Figure 22:
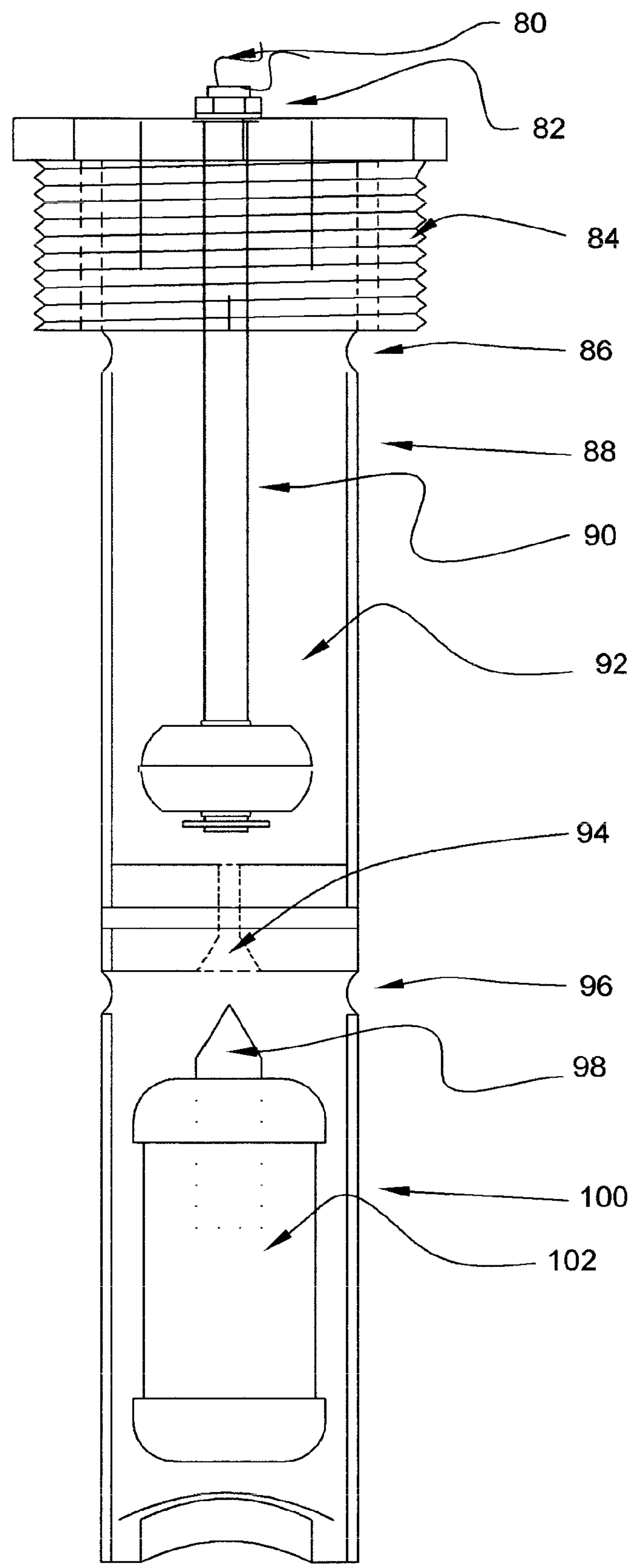
FIG. 22 is fluid level control switch 44.

FIG. 22 shows an adjustable fluid level control switch. A commercially available 5" stainless steel float switch 90 has been modified by removing the retainer stopper clip from the stem. This modification is necessary in big rig uses because of the rough road condition which cause repeated activation, due to the float's close proximity to the magnetic switch. Removing the clip allows the float to rise to the top of the stem. The modified float switch 90 is attached to a hole 82 (can be ¼" drilled in the center of an end cap 84 (e.g. 2" threaded). A bushing is inserted in the end cap to allow a position of the pipe 88 (e.g. 1¼") to fit inside the end cap 84. Pipe 88 forms the top chamber when a machined bushing 94 is attached to hold another pipe 100 which forms the lower chamber to house the stopper/drain float 102.

The operation of the invention FIG. 22 is unique. As the water level rises the stopper/drain float 102 and its cone shaped tip 98 plugs the cone shaped hole on the bushing 94 and the chamber 92 remains dry thus keeping the float switch 90 activated until the water enters through the strategically placed holes 86 which allows the chamber to fill with fluid and deactivate the float switch 90 thus turning off the filler pump 38. The amount of fluid drop or rise can be controlled by raising or lowering the upper holes 86 and if necessary extending the length of the upper pipe 88.

FIG. 23 is an embodiment of a possible wiring diagram utilized in the example FASS. The wiring diagram uses standard automotive wiring practices and is not the only way to wire this system.

Although the invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is, therefore, contemplated that the appended claims will cover such modifications that fall within the scope of the invention.

We claim:

1. An apparatus for producing hydrogen gas comprising:

a source of electric current;

a first chamber containing water and a potassium hydroxide catalyst;

a plurality of electrolysis plates in said water and said potassium hydroxide contained in said first chamber, said plurality of said electrolysis plates being connected to said source of electric current to cause said electric current to flow through said water and said potassium hydroxide to cause hydrogen to be released;

a second chamber connected to said first chamber, said second chamber catching said hydrogen released in said first chamber;

a circulation pump in fluid communication with said first chamber and said second chamber to cause said hydrogen to rise therein;

a radiator between said first chamber and said second chamber to cool said water and said hydrogen;

a return tube from said second chamber to said first chamber to allow said water to flow back into said first chamber;

said plurality of said electrolysis plates diminish in size from a center thereof, edges of said electrolysis plates being coated with electrically resistive material, said electrolysis plates being in a fan arrangement whereby from said center in both directions, said electrolysis plates are bent outward.

* * * * *